United States Patent [19]

Ishii

[11] 4,055,901
[45] Nov. 1, 1977

[54] GYROCOMPASS

[75] Inventor: Susumu Ishii, Tokyo, Japan

[73] Assignee: Kabushiki Kaisha Tokyo Keiki, Tokyo, Japan

[21] Appl. No.: 649,996

[22] Filed: Jan. 19, 1976

Related U.S. Application Data

[63] Continuation-in-part of Ser. No. 474,252, May 29, 1974, abandoned.

[30] Foreign Application Priority Data

May 31, 1973  Japan .................................. 48-61477

[51] Int. Cl.² .......................................... G01C 19/38
[52] U.S. Cl. ................................................... 33/324
[58] Field of Search ............. 33/324, 325, 326, 275 G

[56] References Cited

U.S. PATENT DOCUMENTS

| 2,255,899 | 9/1941 | Ross | 33/326 |
|---|---|---|---|
| 2,406,879 | 9/1946 | Wittkuhns et al. | 33/326 |
| 2,510,068 | 6/1950 | Carter | 33/326 |
| 2,739,390 | 3/1956 | Carter | 33/326 |
| 2,810,291 | 10/1957 | Bishop et al. | 33/324 |
| 3,512,264 | 5/1970 | Ambrosini | 33/324 |
| 3,555,692 | 1/1971 | Aberle et al. | 33/326 |

Primary Examiner—Richard E. Aegerter
Assistant Examiner—Richard R. Stearns
Attorney, Agent, or Firm—Hill, Gross, Simpson, Van Santen, Steadman, Chiara & Simpson

[57] ABSTRACT

A gyrocompass including first and second follow-up means wherein the second follow-up means corrects for various errors without effecting the accuracy of the gyrocompass which eliminates the need of expensive correction signal generators used in the prior art.

4 Claims, 2 Drawing Figures

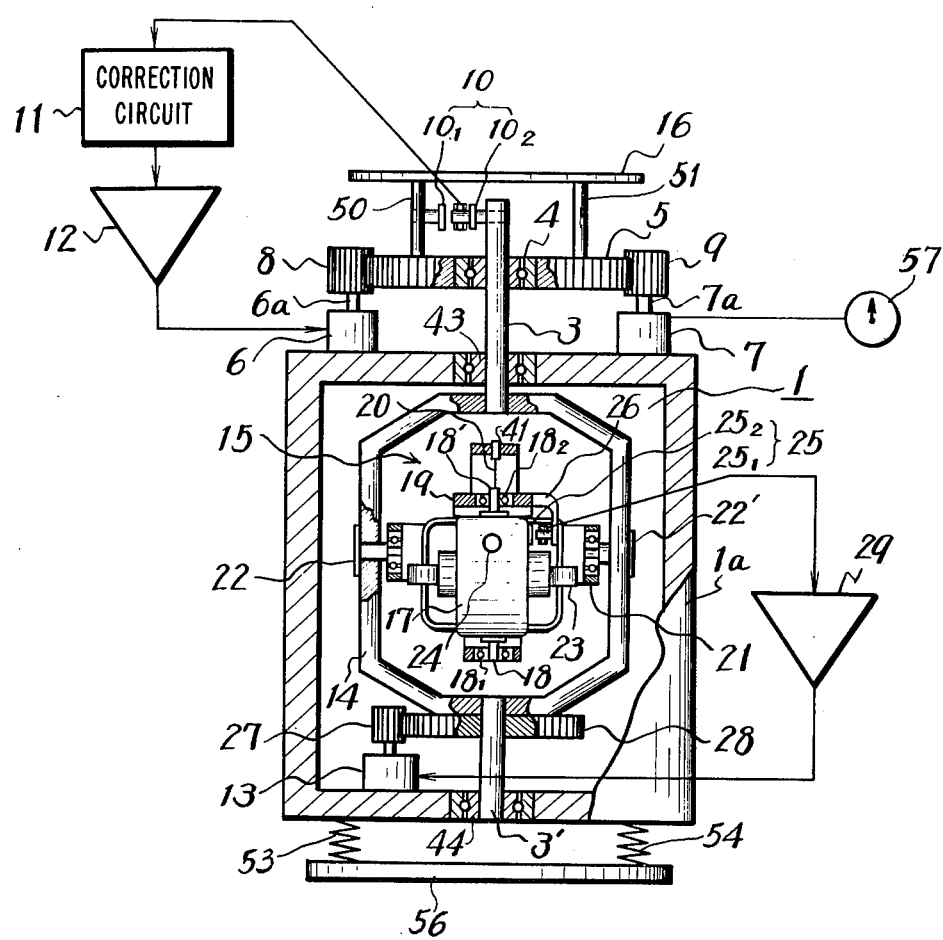

GYROCOMPASS

CROSS REFERENCES TO RELATED APPLICATIONS

This application is a continuation-in-part of application Ser. No. 474,252, now abandoned, filed May 29, 1974.

BACKGROUND OF THE INVENTION

1. Field of the Invention

This invention relates in general to gyrocompasses and in particular to an improved gyrocompass which is compact and inexpensive and has improved accuracy.

2. Description of the Prior Art

Prior art gyrocompasses such as illustrated in this application in FIG. 1 include a master gyrocompass G which include a follow-up system of a well known type which supplies an output to a correction signal generator CS which is a separate housing from the master compass G. The correction signal generator CS is connected through a gear train and a synchro-servo system (not shown). The output signal from the master gyrocompass G is fed to repeaters not shown to indicate the output of the master gyrocompass G after it has been corrected by the correction signal generator CS for latitude and speed errors.

With gyrocompasses of the prior art because the correction signal generator CS is separately provided as a separate unit from the master gyrocompass G the gyrocompass is more complicated and is more expensive and difficult to manufacture and to install. Also, such conventional gyrocompasses of the prior art require much more space than the compass of this invention.

SUMMARY OF THE INVENTION

It is an object of the present invention to provide an improved gyrocompass which is free from the drawbacks of the prior art.

It is another object of the invention to provide a gyrocompass which is compact and inexpensive.

Another object of the invention is to provide an improved gyrocompass which includes two separate and distinct follow-up systems resulting in an improved compact gyrocompass system.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which

BRIEF DESCRIPTION OF THE DRAWINGS

FIG. 2 is a detailed partially sectional view of the gyrocompass of the invention.

DESCRIPTION OF THE PREFERRED EMBODIMENTS

Figure 1:
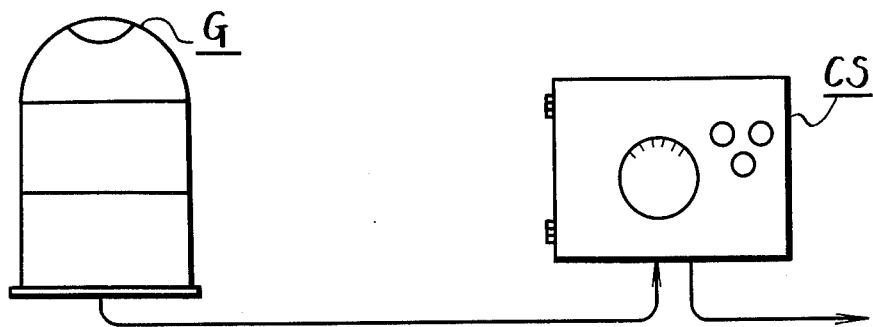
FIG. 1 is a schematic diagram illustrating prior art apparatus.

FIG. 2 illustrates a directional gyrocompass according to the invention which comprises a gyro case 17 which contains a gyro rotor not shown which rotates at high speed within the gyro case and is driven by suitable electrical drive means in a conventional manner. Shafts 18 and 18' extend respectively from the lower and upper surfaces of the gyro case 17 and define a vertical axis. A vertical support ring 19 passes around the gyro case 17 and has lower and upper bearings $18_1$ and $18_2$ through which shafts 18 and 18' extend. Attached to the vertical ring 19 is an upper extending portion 41 and a flexible support, as for example, a piano wire 10 extends from the upper portion 41 to the upper end of shaft 18' so as to support the entire weight of the gyro case 17 from the support 41 and ring 19. Consequently, the bearings $18_1$ and $18_2$ do not support the gyro housing 17 but merely prevent transverse swinging of the gyro case 17 and, thus, very little friction exists in the bearings $18_1$ and $18_2$.

The vertical ring 19 is pivotally supported by horizontal ring 21 by horizontal shafts which extend horizontally on either side of ring 19 and are pivotally connected to the ring 21. The supporting horizontal shafts between ring 21 and ring 19 are at right angles to the shafts 18 and 18' and would extend into and out of the plane of the paper relative to FIG. 2.

The horizontal ring 21 is supported by the follow-up ring 14 which lies primarily in the vertical plane and supports the horizontal ring 21 by horizontal shafts 22 and 22' that extend at right angles to the horizontal shafts which support ring 19 from ring 21. The follow-up ring 14 has upper and lower shafts 3 and 3' which extend at right angles to the shafts 22 and 22' and pass through bearings 43 and 44 mounted in the binnacle 1a as shown.

Mounted in and attached to the binnacle 1a is a servo motor 13 of the first compass follow-up loop. It is coupled through a suitable reduction gear 27 with an azimuth gear 28 attached to the follow-up ring 14 and the follow-up shaft 3'.

Attached to the vertical ring 19 is a conventional liquid balance 23 for providing meridian seeking torques to the gyro case 17. A damping weight 24 is attached to the gyro case 17 to provide damping torque. A conventional electrical pick-up 25 consists of a coil mounted on a bracket 26 attached to the vertical ring 19 and magnetic material such as a magnet $25_2$ which is attached to the gyro case 17. The pick-up 25 detects the relative angular movement between the gyro case 17 and the vertical ring 19 about the vertical shafts 18 and 18' and supplies an output to an amplifier 29 which drives the servo motor 13. The servo motor 13 drives the follow-up ring 14 through the gears 27 and 28 so as to reduce the angular displacement between the gyro case 17 and the vertical ring 19 until the electrical pick-up produces zero output which indicates that the follow-up ring 14 is aligned with the gyro case 17.

The shaft 3 extends through the inner race of a bearing 4 which has its outer race non-rotatably mounted in a gear 5. A compass card 16 is supported from the side surface of gear 5 by standoffs 50 and 51 and can be read against an indicia to indicate azimuth. A servo motor 6 is attached to the binnacle 1a top surface. The output shaft 6a of servo motor 6 carries a gear 8 which meshes with gear 5 and drives it with a suitable gear ratio. A signal generator 7 is also mounted on the upper surface of binnacle 1a and has a shaft 7a which carries a gear 9 which meshes with gear 5 and is driven thereby. An electrical pick-up 10 is mounted between the upper end of shaft 3 and the standoff 50 which is connected to the gear 5 and to the compass card 16. The pick-off 10 may be similar to the pick-up 25 and includes the relative movable parts $10_1$ and $10_2$. An electrical output is supplied from the electrical pick-up 10 to the correction circuit 11 which supplies an output to a servo amplifier 12 which drives the servo motor 6.

The electrical pick-up 10 is utilized in the present invention to detect a relative displacement between the follow-up shaft 3 and the gear 5 and produces an electrical signal corresponding to such displacement which is applied to the servo motor 6 to reduce such displacement to zero.

The binnacle 1a is supported on springs 53 and 54 from a suitable reference surface 56 of the vehicle so as to isolate it from vibration.

In operation, the gyrocompass of the present invention is started by driving the rotor in the gyro case 17 in a conventional manner at high speed and the liquid balance 23 secured to the vertical ring 19 and the damping weight 24 cause the gyro to errect so that the rotor of the gyro lies in the horizontal plane. The servo motor 13 is driven from the output of the pick-up 25 so that the servo motor 13 drives the follow-up ring 14 so as to reduce the angular displacement between the gyro case 17 and the vertical ring 19 to zero and to align the follow-up ring 14 with the gyro case 17. The follow-up shafts 3 and 3' are rotated and when a relative displacement is produced between the gear 5 and the upper follow-up shaft 3 the pick-up 10 will produce an electrical signal corresponding to such relative displacement. This electrical signal produced by the pick-up 10 will be applied to the servo motor 6 through the correction circuit 11 and the amplifier 12 as shown in FIGS. 3 and 4 and the result will be that the servo motor 6 will be driven to rotate the gear 5 attached to the outer ring of the bearing 4 through the rotary shafts 6a and the gear 8 until the relative displacement of the gear 5 to the follow-up shaft 3 arrives at a correct position and, thus, the compass card 16 attached to the gear 5 by the standoffs 50 and 51 will correctly indicate the true azimuth.

Furthermore, since the gear 5 is indicative of the true azimuth and since it meshes with gear 9 which drives the signal generator 7 the output signal from generator 7 will indicate the true azimuth of the gyrocompass and this signal can be applied to a remote indicator 57 to remotely indicate the true azimuth as derived from the gyrocompass 1. As many repeaters 57 as desired can be utilized to indicate the correct azimuth.

It is to be particularly noted that since the second follow-up including the pick-up 10, the servo system 6 and signal generator 7 are all mounted on the binnacle 1a the entire compass can be constructed compactly and inexpensively.

In some systems, the correction circuit can be eliminated and the output of the pick-up 10 can be directly applied to the motor 6 through the amplifier 12.

Although the second follow-up system is shown as mounted on the binnacle 1a, it is to be realized that such system can be mounted on other fixed parts such as the vertical ring of the gyrocompass.

The present invention is described as applied to the so-called Sperry type gyrocompass but the present invention can also be applied to a floating type gyrocompass in which the sensitive member or gyrosphere floats.

The second follow-up means achieves the correction of errors caused by the latitude and speed of the gyrocompass and the driving of the signal generator which generates an azimuth signal to an external part. As is well known, the latitude and speed errors are corrected by supplying a bias to the follow-up servo, or an offset of such an amount to be corrected is given to the mechanical matching between the shaft 3 and gear 5. When such an offset is given to the first follow-up means in prior art systems, it causes an error in the gyrocompass, in which the sensitive element is supported by the first follow-up member through the suspension wire due to the fact that the torsion of the suspension wire is applied to the sensitive element.

Generally, in prior art devices the gyro rotor is an electric motor, so that wires for supplying electric power thereto are necessary, which also causes an error because torque is applied to the sensitive element. As may be apparent when a bias is applied to the first follow-up servo, it becomes very difficult to maintain accuracy of the gyrocompass in the prior art system.

On the contrary, according to the present invention, various errors of the gyrocompass can be corrected without affecting the accuracy of the gyrocompass by the provision of the second follow-up means. Prior systems have not utilized a second follow-up system.

Although the invention has been described with respect to preferred embodiments it is not to be so limited as changes and modifications can be made which are within the full intended scope as defined by the appended claims.

I claim as my invention:

1. A gyrocompass comprising, a housing,
   a follow-up ring, vertical shafts attached to said follow-up ring and rotatably supported by said housing to rotate about a vertical axis,
   a directional gyro case including a rotor supported by said follow-up ring by a gimbel system mounted thereon and adapted to indicate direction,
   a first electrical pick-up having a null position mounted on said gyro case and said gimbel system in opposed relationship to detect relative movement therebetween about said vertical axis,
   a first servo motor mounted on said housing to receive a signal from said first pick-up,
   said first servo motor operatively connected to said follow-up ring to drive it until the output of said first electrical pick-up indicates its null position,
   a first gear rotatably mounted on one of said vertical shafts attached to said follow-up ring,
   a compass card attached to rotate with said first gear,
   a second electrical pick-up having a null position mounted to detect displacement between said first gear and said one vertical shaft, and
   a second servo motor mounted on said housing and receiving the output of said second electrical pick-up and operatively connected to drive said first gear to reduce the output of said second electrical pick-up to indicate its null position.

2. A gyrocompass according to claim 1 including a signal generator mounted on said housing and being operatively driven by said first gear, and an indicator connected to said signal generator to indicate azimuth.

3. A gyrocompass according to claim 1 including a correction circuit connected between said second electrical pick-up and said second servo motor for correcting speed and latitude errors.

4. In a gyrocompass comprising a housing, a gyro case, a gimbal supporting the gyro case, a follow-up shaft, a follow-up ring rotatably supported by said housing to rotate about a vertical axis on said follow-up shaft, and said gimbal is mounted within the follow-up ring, a first follow-up system including detecting means mounted on the gimbal support and the gyro case to detect a relative movement therebetween about the vertical axis, the improvement comprising a second follow-up detecting means mounted to said housing and said follow-up shaft, wherein said second follow-up detecting means includes a first gear rotatably mounted on said follow-up shaft, a signal generator mounted on said housing and having a rotary shaft, an indicator connected to said signal generator, a second gear in mesh with said first gear, and said rotary shaft of said signal generator fixed to said second gear, a pick-up mounted for detecting a displacement between said follow-up shaft and said first gear, a third gear in mesh with said first gear, a servo motor mounted on said housing and its rotary shaft fixed to said third gear and supplied the output from said pick-up and driving said first gear and a compass card attached to said first gear.

* * * * *